(12) United States Patent
Okamoto et al.

(10) Patent No.: US 8,651,513 B2
(45) Date of Patent: Feb. 18, 2014

(54) AIRBAG

(75) Inventors: Masakazu Okamoto, Yokohama (JP);
Akifumi Hanawa, Yokohama (JP);
Takashi Ohshima, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 13/579,803

(22) PCT Filed: Feb. 2, 2011

(86) PCT No.: PCT/JP2011/052161
§ 371 (c)(1),
(2), (4) Date: Aug. 17, 2012

(87) PCT Pub. No.: WO2011/102224
PCT Pub. Date: Aug. 25, 2011

(65) Prior Publication Data
US 2012/0313358 A1 Dec. 13, 2012

(30) Foreign Application Priority Data

Feb. 17, 2010 (JP) ................................ 2010-031883

(51) Int. Cl.
*B60R 21/20* (2011.01)
*B60R 21/206* (2011.01)
(52) U.S. Cl.
USPC ...................................... 280/728.2; 280/740
(58) Field of Classification Search
USPC .................... 280/728.2, 730.1, 740
See application file for complete search history.

(56) References Cited

U.S. PATENT DOCUMENTS

| 7,549,671 | B2 * | 6/2009 | Mizuno et al. | 280/730.1 |
| 7,604,250 | B2 * | 10/2009 | Hotta et al. | 280/728.2 |
| 8,029,016 | B2 * | 10/2011 | Moritani | 280/730.1 |
| 2003/0006587 | A1 | 1/2003 | Jang et al. | |
| 2006/0108780 | A1 * | 5/2006 | Hotta et al. | 280/732 |
| 2006/0279073 | A1 | 12/2006 | Hotta et al. | |
| 2007/0096439 | A1 * | 5/2007 | Kashiwagi | 280/728.2 |

(Continued)

FOREIGN PATENT DOCUMENTS

| CN | 1394774 | 2/2003 |
| CN | 101011957 | 8/2007 |

(Continued)

OTHER PUBLICATIONS

International Search Report of PCT/JP2011/052161 Mailed May 10, 2011 (4 pages).

*Primary Examiner* — James English
(74) *Attorney, Agent, or Firm* — Brinks Gilson & Lione

(57) ABSTRACT

An airbag having a cushion part defining an insertion hole that is positioned between first and second sewing lines provided to a base fabric and that is provided for the insertion of the inflator from an outside to an inside. A diffuser positioned within the cushion part and in which the inflator is inserted from the insertion hole. The diffuser has a tubular portion with a portion formed by folding layers of fabrics and being sewn to the base fabric along the first sewing line. The diffuser fabric of the tubular portion on a side adjacent to the base fabric being additionally sewn to the base fabric along a second sewing line. The diffuser includes a guide member 1 that extends and covers the insertion hole with a surface that continues from an inner surface of the diffuser. The guide member being sewn to the base fabric along the first sewing line.

8 Claims, 18 Drawing Sheets

(56) References Cited

U.S. PATENT DOCUMENTS

| | | |
|---|---|---|
| 2007/0182134 A1 | 8/2007 | Mizuno et al. |
| 2008/0088118 A1* | 4/2008 | Wipasuramonton et al. ............ 280/728.2 |
| 2009/0212542 A1 | 8/2009 | Toda et al. |
| 2011/0316263 A1* | 12/2011 | Lunt et al. ............ 280/730.2 |
| 2012/0025496 A1* | 2/2012 | Schneider et al. ......... 280/728.2 |

FOREIGN PATENT DOCUMENTS

| | | |
|---|---|---|
| DE | 10 2007 000 069 | 8/2007 |
| DE | 10 2006 023 203 | 12/2009 |
| DE | 602008001736 | 8/2010 |
| EP | 1 273 486 | 1/2003 |
| EP | 1 849 661 | 10/2007 |
| EP | 1 852 317 | 11/2007 |
| EP | 1 964 726 | 9/2008 |
| JP | 2003-34214 | 2/2003 |
| JP | 2004 330959 | 11/2004 |
| JP | 2006-321334 | 11/2006 |
| JP | 2007 203937 | 8/2007 |
| JP | 2009-196540 | 9/2009 |
| KR | 10 2003-0003586 | 1/2003 |
| KR | 10-2003-0039251 | 5/2003 |

* cited by examiner

AIRBAG

BACKGROUND

1. Field of the Invention

The present invention relates to an airbag that is used as a knee airbag, or the like, housed below an instrument panel.

2. Related Technology

A knee airbag is an occupant restraint system which is inflated and deployed near the occupant's knee region upon the occurrence of an automobile accident. As a result of deployment of a knee airbag, it is possible to prevent the occupant's knee region from colliding with the instrument panel or the like.

A knee airbag is mainly housed below the instrument panel; for instance, inside the lower part of the steering column cover in the case of the driver seat. In order to enable the mounting thereof in a limited housing space, a knee airbag is mounted in a state of being folded or wound into a compact size. Moreover, in the event of an accident, the knee airbag receives the supply of gas from an inflator (gas generator) and is inflated and deployed toward the inside of the occupant compartment of the vehicle.

The knee airbag needs to be inflated and deployed in the space defined from below the instrument panel to the occupant's knee region. Since this space is extremely small, it is not possible to prevent the knee region from colliding with the instrument panel unless the knee airbag is inflated and deployed quickly. Thus, the knee airbag is devised in terms of the folding method and the smooth inflow of gas in order to achieve instantaneous deployment.

For example, Japanese Patent Application Publication No. 2004-330959 discloses a passenger seat airbag device with a knee region protection bag internally comprising an inflator that is inserted into a substantially cylindrical diffuser (rectifier). According to this document, first to third rectifying openings having different opening areas are formed in the diffuser, and, by using such first to third rectifying openings, the knee region protection bag can be deployed ahead of the head/chest protection bag.

With the technology described in Japanese Patent Application Publication No. 2004-330959, the tubular diffuser is long and overlaps with the insertion hole of the inflator. Accordingly, a hole is formed in the diffuser at the position which overlaps with the insertion hole, and the inflator that is inserted from the outside to the inside through the insertion hole was directly guided and inserted into the diffuser. Nevertheless, the outlet of both ends of the long diffuser becomes blocked due to the folding of the airbag during the housing thereof, resulting in a so-called choking where gas cannot be smoothly discharged from both ends of the tubular diffuser during the inflation and deployment of the airbag occurred.

Thus, one consideration may be shortening the diffuser. Consequently, while the diffuser will no longer overlap with the insertion hole and be positioned slightly separated from the insertion hole, a need arises for moving the tip of the inserted inflator to the end of the tubular diffuser upon the insertion thereof. Here, there is a possibility that the inflator is erroneously deviated outside the tubes of the diffuser.

SUMMARY

In light of the foregoing problems, an object of the present invention is to provide an airbag in which an inflator can be inserted into a diffuser without being deviated, even when a tubular portion of the diffuser in the airbag is short and separated from the inflator insertion hole.

In order to achieve the foregoing object, a representative configuration of the present invention provides an airbag internally housing a cylinder-type inflator, comprising an insertion hole for inserting the inflator from an outside to an inside of the airbag, a diffuser which forms a semi-closed space by substantially including an opening, and a guide member for guiding the inflator into the semi-closed space upon inserting the inflator.

The foregoing guide member may be coupled to an edge of the opening so as to be capable of guiding the inflator substantially continuously from the insertion hole to the opening.

The foregoing guide member may be provided to substantially overlap with the insertion hole so as to be capable of guiding the inflator substantially continuously from the insertion hole to the opening.

In order to achieve the foregoing object, another representative configuration of the present invention provides an airbag internally housing a cylinder-type inflator, comprising an insertion hole which is positioned between first and second sewing lines provided to a ground fabric and which is provided for inserting the inflator from an outside to an inside, and a diffuser into which the inflator inserted from the insertion hole is inserted, and which has a tubular portion in which a portion that is layered by folding a fabric is sewn to the ground fabric along the first sewing line, the fabric of the tubular portion on a side adjacent to the ground fabric being additionally sewn to the ground fabric along the second sewing line, wherein the diffuser includes a guide member which covers the insertion hole with a surface that continues from an inner surface of the diffuser, and which is sewn to the ground fabric along the first sewing line.

According to the foregoing configuration, the tip of the inflator that was inserted from the insertion hole comes into contact with the guide member of the diffuser. The surface of the guide member that comes into contact with the inflator is continuous from the inner surface of the diffuser. Accordingly, even though the tubular portion of the diffuser is separated from the insertion hole in order to prevent choking, the inflator is guided by the guide member simply by pushing the inflator, and can be inserted into the diffuser without being deviated.

The foregoing diffuser may be of a multiple tubular shape in which a plurality of fabrics are folded and layered, and the fabric on an innermost side of the multiple tubular shape may include the guide member.

When adopting a multiple tubular shape in order to increase the strength of the diffuser, it is necessary to insert the inflator into the innermost tube. Thus, the guide member was provided to the innermost fabric. Consequently, in addition to being able to prevent the deviation of the inflator to the outside of the deflator, it is also possible to prevent the inflator from entering the gap between the multiple tubes configuring the deflator.

The tubular portion of the foregoing diffuser may have a rectangular cross section. As a result of configuring the tubular portion to have a rectangular cross section, it is possible to maximize the rectification of the tubular portion which substantially functions as the diffuser.

According to the present invention, it is possible to provide an airbag in which an inflator can be inserted into a diffuser without being deviated, even when a tubular portion of the diffuser in the airbag is short and separated from the inflator insertion hole.

DETAILED DESCRIPTION

Figure 1:
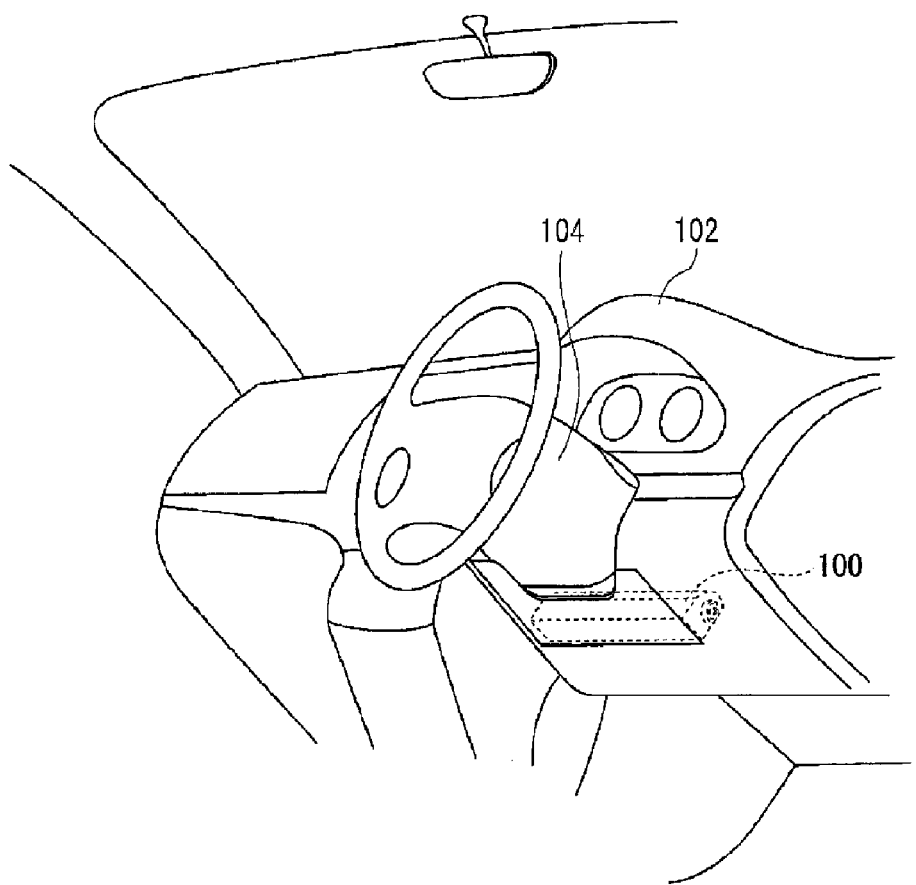
FIG. 1 is a diagram illustrating the in-vehicle housing position of the knee airbag according to an embodiment of the present invention.

The preferred embodiments of the present invention are now explained in detail with reference to the appended drawings. The dimensions, materials and other specific numerical values indicated in the embodiments are merely illustrations for facilitating the understanding of the invention, and do not limit the present invention unless specifically indicated to such effect. Note that functions and configurations that are substantially the same in the specification and drawings are given the same reference numeral so as to omit any redundant explanation, and the illustration of elements which are not directly related to the present invention is omitted.

FIG. 1 is a diagram illustrating the in-vehicle housing position of the knee airbag according to an embodiment of the present invention. The knee airbag 100 is housed below an instrument panel 102. The knee airbag 100 of this embodiment is for use on the driver seat side, and is housed at the lower part of a steering column cover 104. The knee airbag 100 is inflated and deployed toward the inside of the occupant cabin of the vehicle upon impact during a collision accident or the like. While not illustrated, the knee airbag 100 can also be used as an airbag for the passenger seat side.

Figure 2:
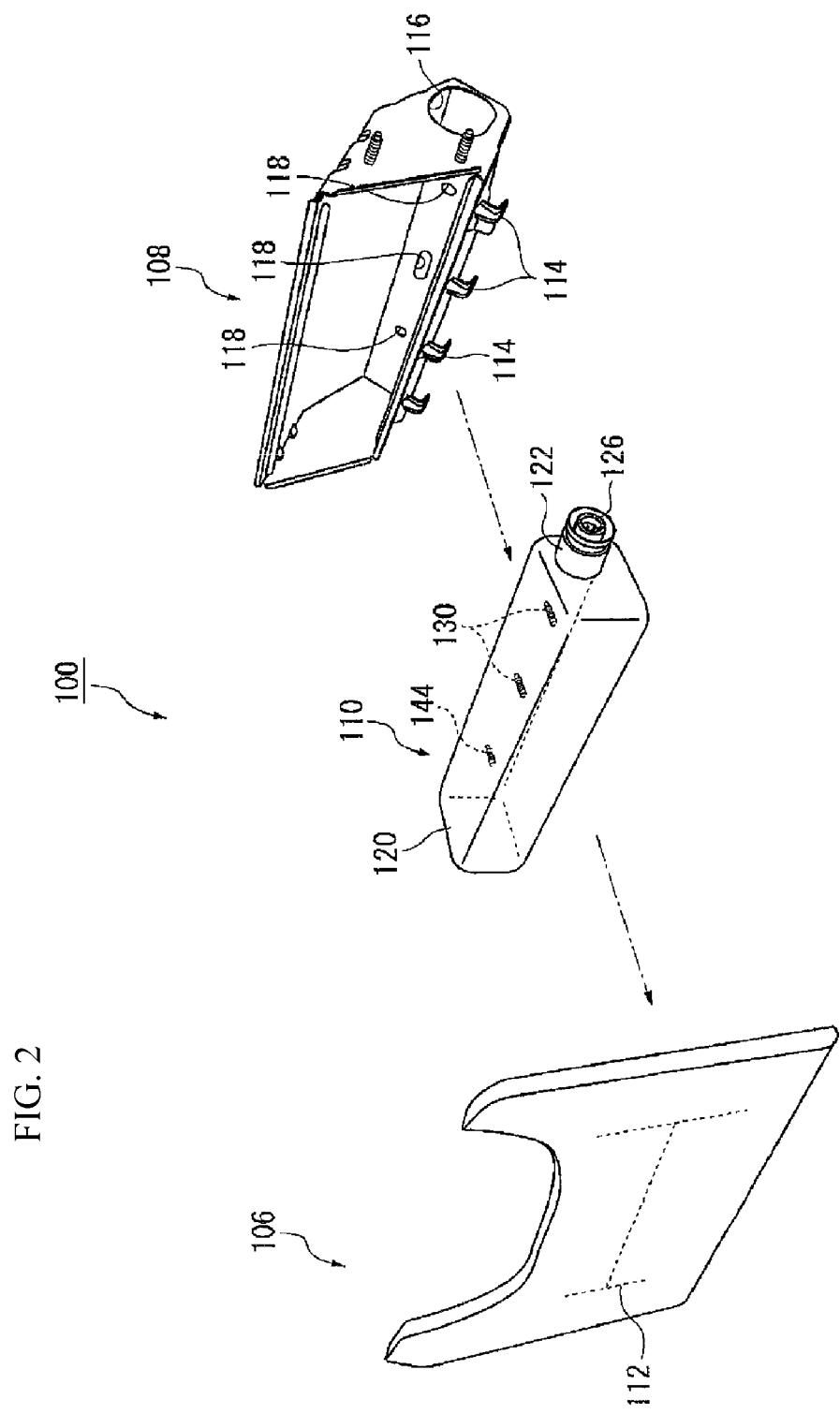
FIG. 2 is an exploded view of the knee airbag of FIG. 1.

FIG. 2 is an exploded view of the knee airbag of FIG. 1. As illustrated in FIG. 2, the knee airbag 100 is configured by comprising a folded cushion part 110 between a knee airbag cover 106 and a housing 108.

The knee airbag cover 106 is exposed as an interior member in the occupant cabin of the vehicle. A tear-line 112, to be torn upon the inflation and deployment of the cushion part 110, is provided to the inner side (cushion part 110 side) of the knee airbag cover 106.

The housing 108 is a box member which functions as the exterior of the cushion part 110. The housing 108 is mounted to the vehicle so as to contain the cushion part 110 therein. A plurality of hook parts 114 for mounting the knee airbag cover 106 are provided to the housing 108. The housing 108 is desirably configured from a highly rigid material for supporting the cushion part 110 to be inflated and deployed, and the housing 108 of this embodiment is made of metal.

An inflator mounting hole 116 and a bolt holes 118 are provided in the housing 108. One end (connector 126 side) of the inflator 122 to be positioned in the cushion part 110 is inserted through the inflator mounting hole 116. A stud bolt 130 and a weld bolt 144 of the inflator 122 are inserted through and fixed to the bolt hole 118.

The cushion part 110 is a member which is inflated and deployed for protecting the occupant. The cushion part 110 is mounted in the housing 108 in a compact size by being folded and wound. The cushion part 110 is packaged with a flap 120 for maintaining the folded state thereof. The flap 120 is a thin fabric material, and can be easily broken when the cushion part 110 is inflated and deployed. An inflator 122 to become the supply source of gas for achieving inflation/deployment is inserted into the cushion part 110.

Figure 3:
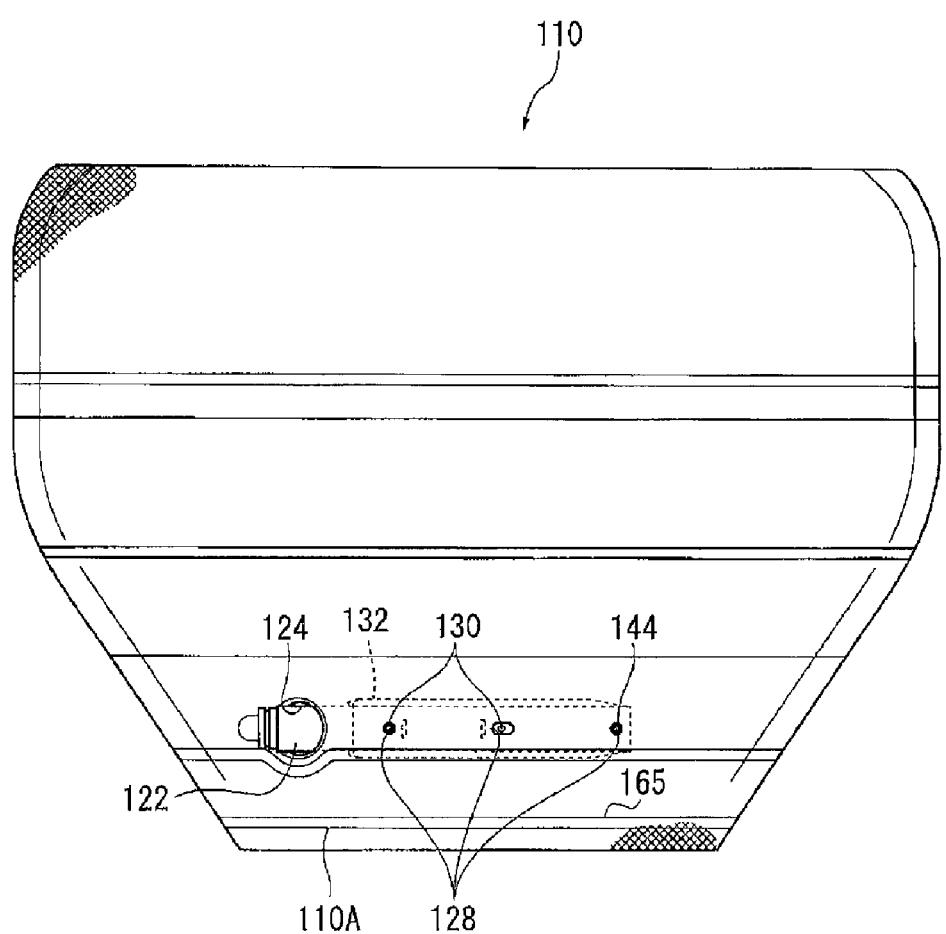
FIG. 3 is a diagram illustrating the deployed state of the cushion part of FIG. 2.

FIG. 3 is a diagram illustrating the deployed state of the cushion part 110 of FIG. 2. As illustrated in FIG. 3, the cushion part 110 is formed by sewing the front and back of the base fabric configuring the surface thereof.

An insertion hole 124 for inserting, from the outside to the inside, the inflator 122 that was inserted into the deflector 132 is provided to the cushion part 110. In a folded state of the cushion part 110, one end (connector 126 side) of the inflator 122 is exposed from the insertion hole 124 (refer to FIG. 2). After the cushion part 110 is housed in the housing 108, a wiring (not shown) for output signals is connected to the connector 126 through the inflator mounting hole 116. A bolt hole 128 is provided to the cushion part 110, and it is thereby possible to expose the stud bolt 130 and the weld bolt 144 of the inserted inflator 122 to the outside.

Figure 4:
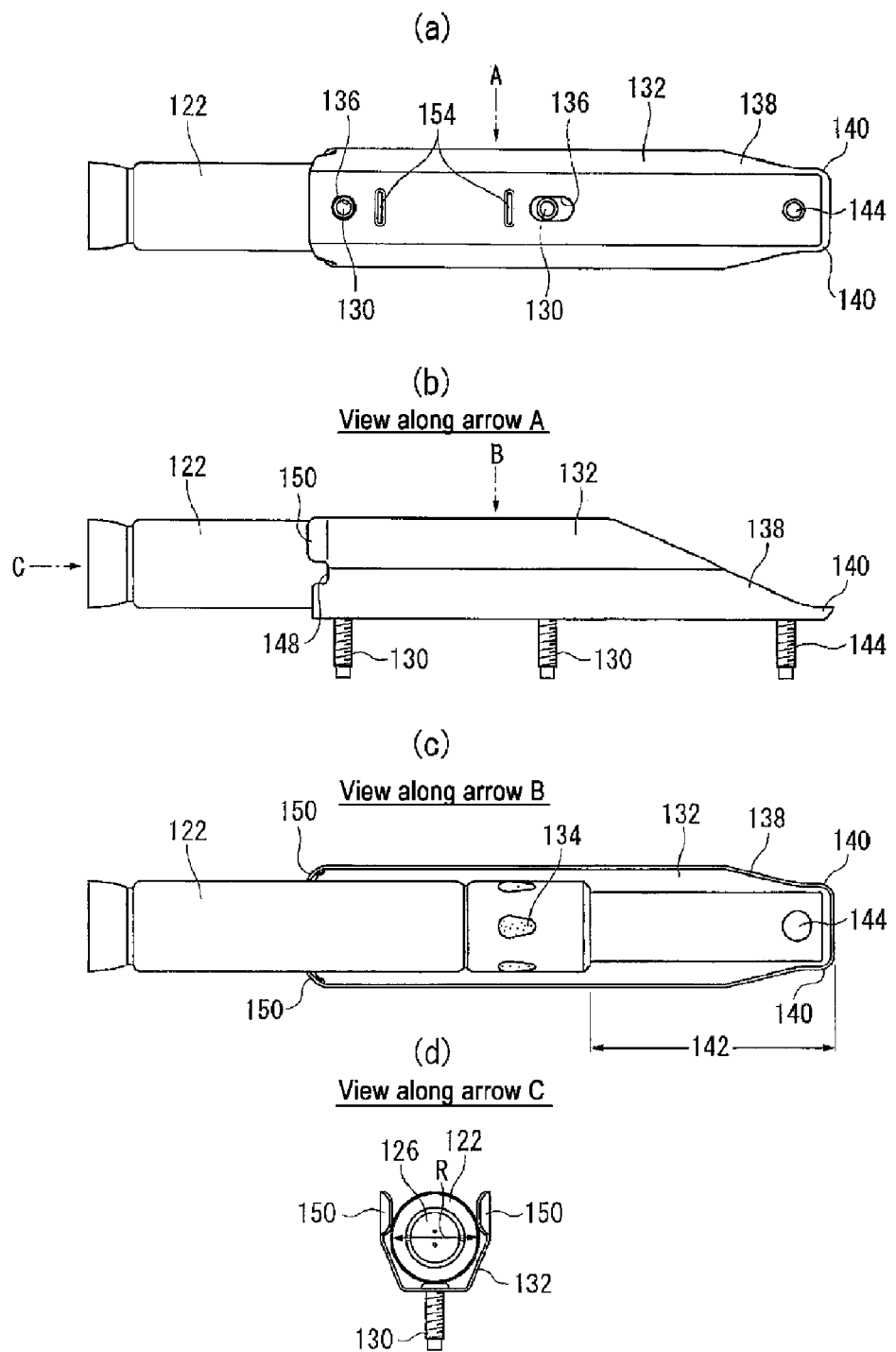
FIGS. 4(a)-4(d) are views showing the deflector which houses the inflator of FIG. 3.

FIG. 4 is a diagram explaining the deflector 132 which houses the inflator 122 of FIG. 3. FIG. 4(a) is an enlarged view of the deflector 132 and the inflator 122 of FIG. 3, FIG. 4(b) is a view along an arrow A of the deflector 132 and the inflator 122 of FIG. 4(a), FIG. 4(c) is a view along an arrow B of the deflector 132 and the inflator 122 of FIG. 4(b), and FIG. 4(d) is a view along an arrow C of FIG. 4(b).

As illustrated in FIG. 4(c), the inflator 122 is of a cylinder type. The inflator 122 internally includes an ignition device and a gas generating agent, and, upon receiving an output signal from the connected wiring (not shown), the ignition device is activated and instantaneously burns the peripheral gas generating agent to generate gas for airbag inflation/deployment. The generated gas is supplied from gas jetting ports 134, which are provided in the surface of the inflator 122, to the cushion part 110.

As illustrated in FIG. 4(b), the inflator 122 includes stud bolts 130. The stud bolts 130 fasten through the bolt hole 136 of the deflector 132, the bolt hole 128 of the cushion part 110, and the bolt hole 118 of the housing 108.

As illustrated in FIG. 4(b), the deflector 132 is a member for directing the gas discharged from the inflator 122. The deflector 132 houses at least the gas jetting port 134 in a state where one end of the inflator 122 is exposed.

An end 138, on the weld bolt 144 side of the deflector 132, has a tapered shape. Moreover, the end 138 is subject to bending work for rounding a corner 140 of the tip as illustrated in FIG. 4(c). Consequently, insertion into the cushion part 110 can be performed smoothly without getting stuck.

As illustrated in FIG. 4(c), the deflector 132 fixes the inflator 122 so that the gas jetting port 134 of the inflator 122 is positioned substantially at the center in the longitudinal direction. The deflector 132 includes a directing portion 142 for directing the gas and which does not include the inflator 122. As a result of providing the directing portion 142, the gas is directed in the longitudinal direction of the deflector 132 (width direction in the cushion part 110). The deflector 132 is made of metal and, not only does it yield the gas directing effect, it also has the function of protecting the cushion part 110 from the heat generated by the gas.

As illustrated in FIG. 4(a), the deflector 132 is provided with a bolt hole 136 for passing the stud bolt 130 of the inflator 122 therethrough. The deflector 132 is fixed to the housing 108, together with the inflator 122 and the cushion part 110, via the stud bolt 130 (refer to FIG. 2). Moreover, the deflector 132 includes a weld bolt 144 (refer to FIG. 4(b)), and is also fixed to the housing 108 via the weld bolt.

Figure 5:
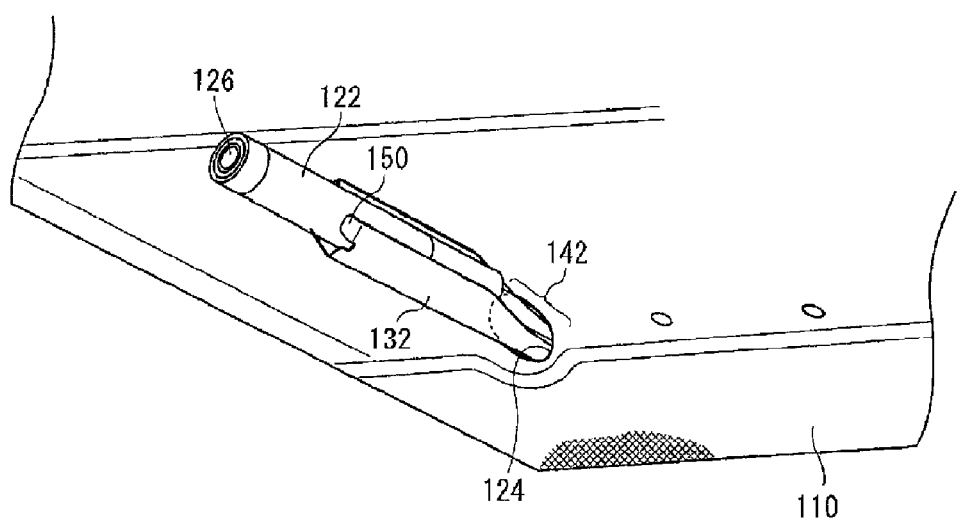
FIG. 5 is a diagram illustrating a state where the inflator of FIG. 4 is inserted, together with the deflector, through the insertion hole into the cushion part of FIG. 3.

FIG. 5 is a diagram illustrating a state where the inflator 122 of FIG. 4 is inserted, together with the deflector 132, from the insertion hole 124 into the cushion part 110 of FIG. 3. Normally, a connector 126 is provided to one end of the inflator 122, and connected to a wiring for sending outside signals to the internal firing device. Thus, the positioning of the inflator 122 relative to the deflector 132 is determined by the stud bolt 130 and the like provided to the inflator 122, and the wiring can be easily connected by causing one end of the inflator 122 to be exposed from the deflector 132 and the cushion part 110. Meanwhile, based on the foregoing positioning, the directing portion 142 for directing gas, which does not include the inflator 122, is provided to the deflector 132.

In this embodiment, as a result of providing a tab 150 to the deflector 132, it is possible to house the inflator 122 in a state where one end is exposed, and, even with the existence of the directing portion 142 that does not include the inflator 122, the inflator 122 can be fixed in a posture that is straight together with the deflector 132. Accordingly, upon inserting the deflector 132 into the cushion part 110, it is possible to reliably prevent the deviation of the inflator 122 from the deflector 132.

Figure 6:
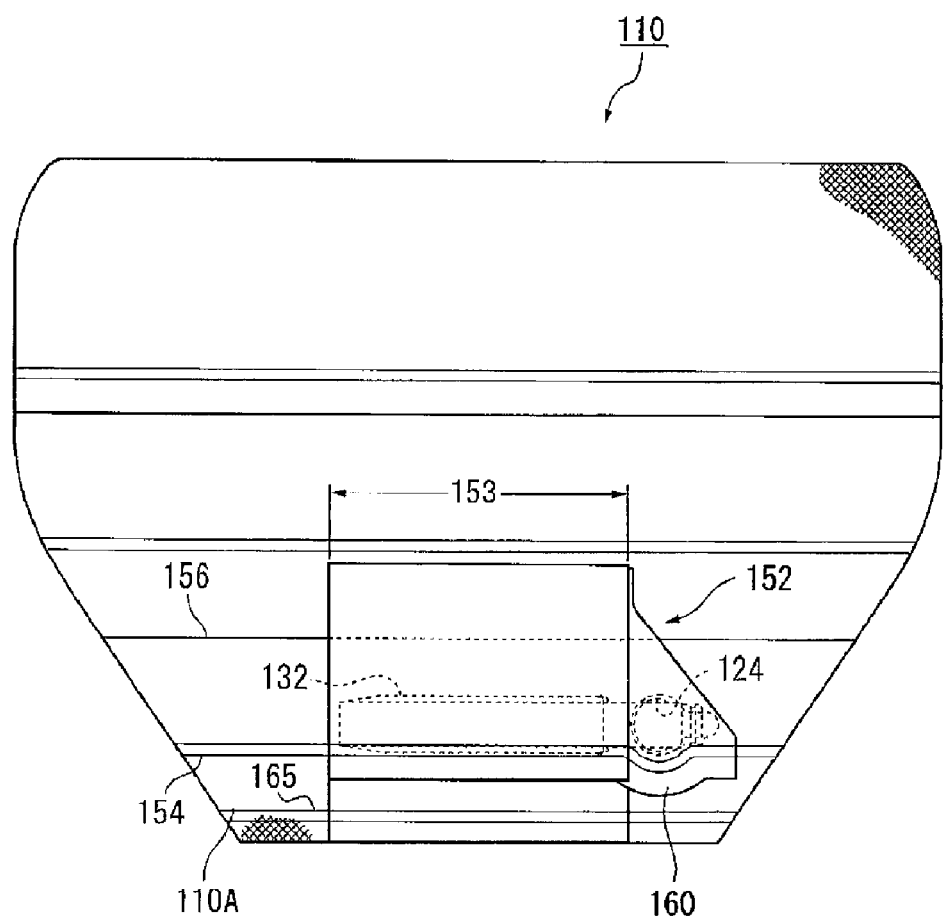
FIG. 6 is a diagram viewed from the inside of the cushion part upon turning over the cushion part of FIG. 3 and showing the diffuser.

FIG. 6 is a diagram viewed from the inside of the cushion part 110 upon turning over the cushion part 110 of FIG. 3. In other words, the base fabric on the opposite side is not shown. A diffuser 152 into which the inflator 122 and the deflector 132, which were inserted from the insertion hole 124, are inserted is provided to the back side of the base fabric 110A provided with the insertion hole 124 of FIG. 3. In FIG. 6, since the insertion hole 124 and the deflector 132 (internally housing the inflator 122) are not visible, they are shown with a broken line. The diffuser 152 directs the gas supplied from the inflator 122 in the horizontal direction of FIG. 6 as a result of the inflator 122 being inserted together with the deflector 132.

A first sewing line 154 and a second sewing line 156 are provided to the base fabric 110A, and the insertion hole 124 is positioned therebetween.

Figure 7:
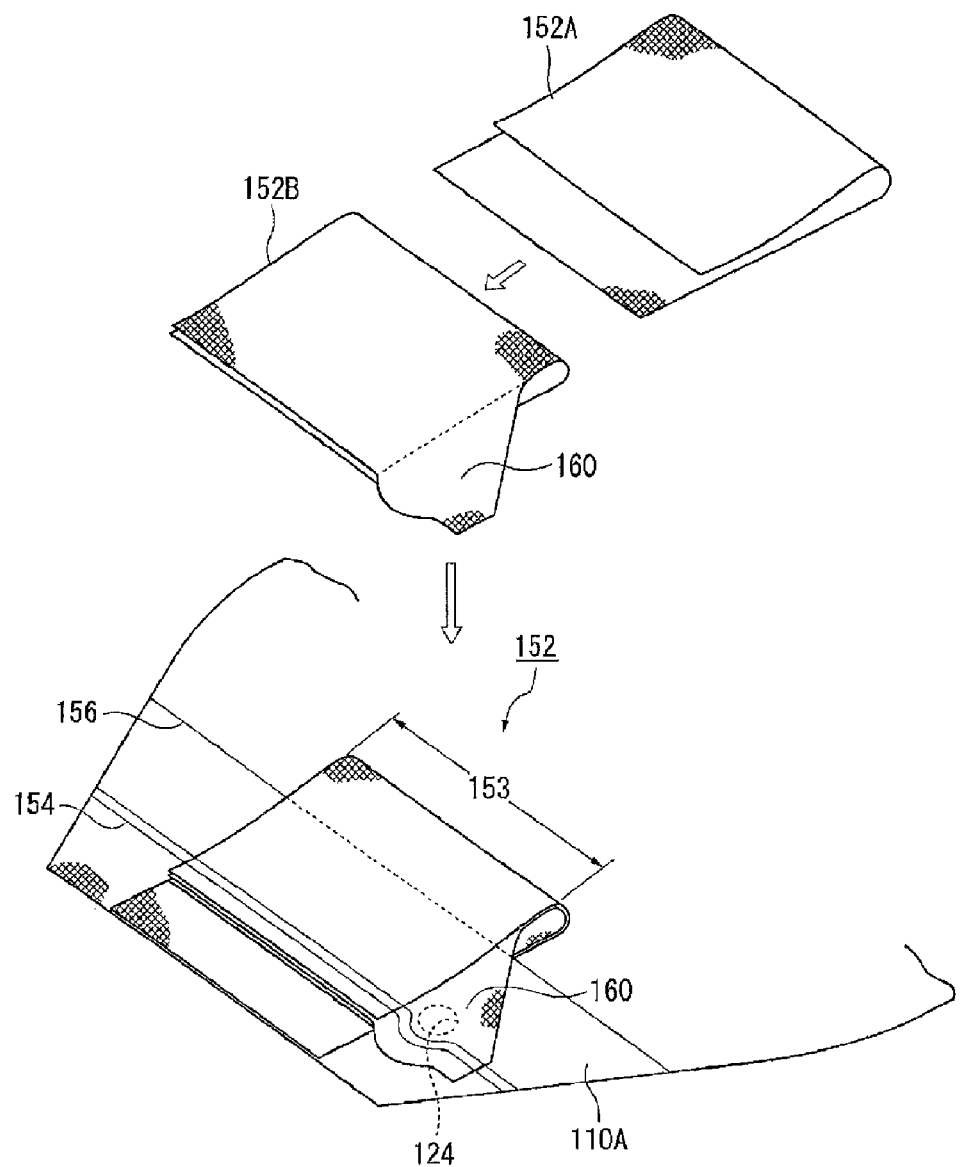
FIG. 7 is an exploded view of the diffuser of FIG. 6.

FIG. 7 is an exploded view of the diffuser 152 of FIG. 6. In FIG. 7, the inflator 122 and the deflector 132 are not shown. As illustrated in FIG. 7, the diffuser 152 is obtained as a result of two diffuser fabrics 152A, 152B being folded and layered. The end portion where the diffuser fabrics 152A, 152B are folded and layered is sewn to the base fabric 110A along the first sewing line 154. Consequently, the diffuser 152 is formed in a double tubular shape. While the diffuser 152 has a double tubular shape in this embodiment, the number of fabrics may be increased or decreased, and the diffuser 152 may also be of a single or triple or more tubular shape.

The sewing procedures are as follows. Foremost, the layered diffuser fabrics 152A, 152B are sewn along the second sewing line 156 inside the airbag body. Subsequently, as shown in FIG. 7, the diffuser fabrics 152A, 152B are folded and sewn along the first sewing line 154. The diffuser 152 becomes a tubular shape only after being sewn along the first sewing line 154.

Of the tubular portion 153 of the diffuser 152, the fabric on the side that is adjacent to the base fabric 110A is only sewn to the base fabric 110A along the second sewing line 156.

The fabric 152B on the innermost side of the double tubular shape of the diffuser 152 includes a guide member 160. The guide member 160 covers the insertion hole 124 with the surface that is continuous from the inner surface of the diffuser 152 (inner surface of the folded fabric 152B). The guide member 160 is sewn to the ground fabric 110A along the first sewing line 154.

Figure 8:
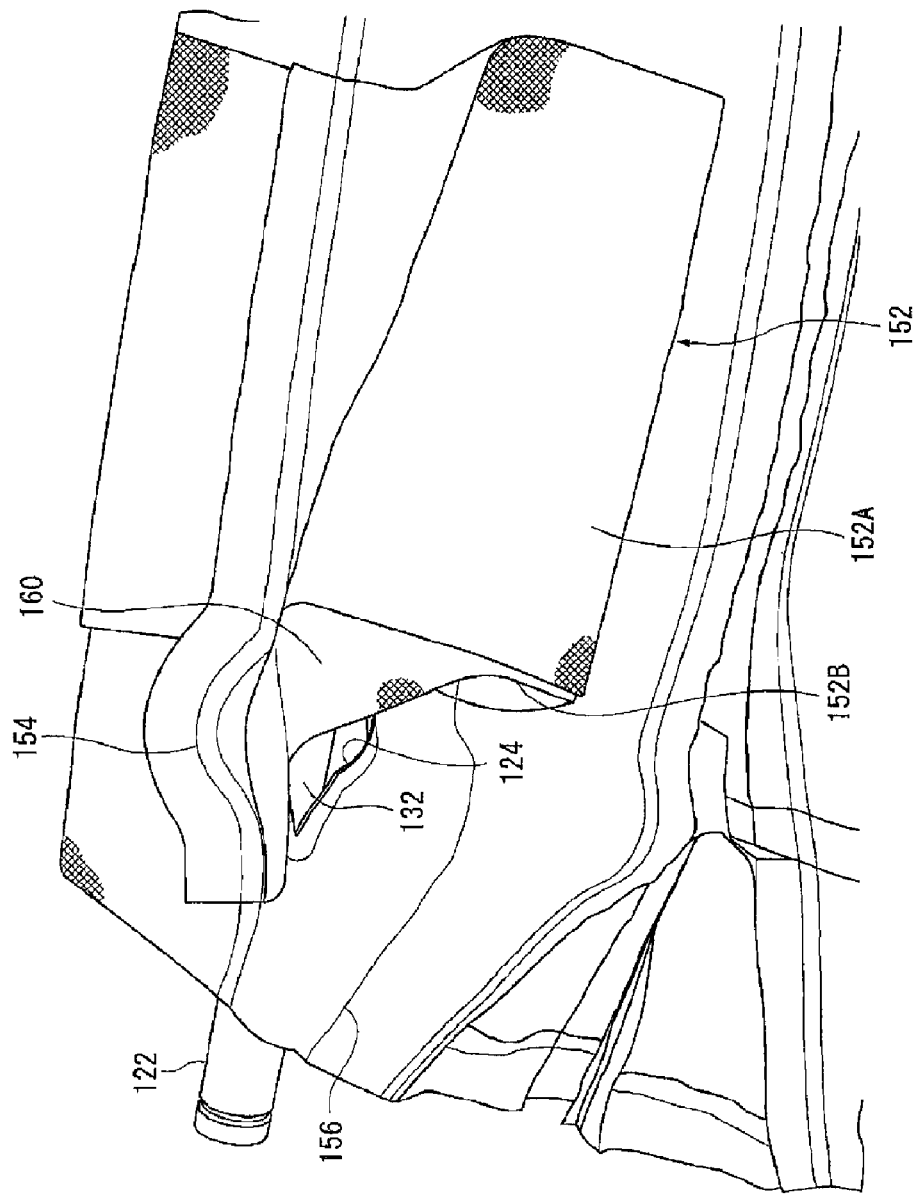
FIG. 8 is a diagram viewing the cushion part 110 of FIG. 5 from the inside.

FIG. 8 is a diagram viewing the cushion part 110 of FIG. 5 from the inside. According to the configuration described above, the tip of the inflator 122 (actually, the deflector 132 housing the inflator 122) inserted from the insertion hole 124 comes into contact with the guide member 160 of the diffuser 152. The surface of the guide member 160 that comes into contact is continuous from the inner surface of the diffuser 152 (inner surface of the folded fabric 152B). Accordingly, even though the tubular portion 153 of the diffuser 152 is separated from the insertion hole 124 (refer to FIG. 6 and FIG. 7) in order to prevent choking, simply by pushing the inflator 122 as shown in FIG. 8, the inflator 122 can be guided by the guide member 160, and inserted into the diffuser 152 as shown in FIG. 6 without being deviated.

Since the guide member 160 of the diffuser 152 is a single fabric and not of a tubular shape, it does not substantially function as the diffuser 152. Accordingly, the guide member 160 is never subject to choking. Nevertheless, the guide member 160 is sewn to the ground fabric 110A along the first sewing line 154. Thus, even if the inserted inflator 122 and deflector 132 come into contact, displacement will not occur as a result thereof, and the inserted inflator 122 and the deflector 132 can be guided to the inner surface of the diffuser 152.

Conventionally, the diffuser 152 was formed short due to the problem of choking. Consequently, the diffuser 152 no longer overlaps with the insertion hole 124 and is positioned slightly separated from the insertion hole 124. Thus, it was necessary to move the tip of the inserted inflator 122 to the end of the tubular diffuser 152 upon the insertion thereof. In the foregoing case, there is a possibility that the inflator 122 is erroneously deviated outside the tubes of the diffuser 152, but this embodiment can resolve this problem.

When the diffuser 152 is formed in a multiple tubular shape in order to increase the strength of the diffuser 152 as with this embodiment, it is necessary to insert the inflator 122 into the innermost tube; that is, into the diffuser fabric 152B. Thus, the guide member 160 is provided to the innermost diffuser fabric 152B. Consequently, in addition to being able to prevent the deviation of the inflator 122 to the outside of the diffuser 152, it is also possible to prevent the inflator 122 from entering the gap between the multiple tubes (gap between the diffuser fabrics 152A, 152B) configuring the diffuser 152.

Moreover, as illustrated in FIG. 6, in this embodiment, the tubular portion 153 of the diffuser 152 has a rectangular cross section. As a result of configuring the tubular portion 153 to have a rectangular cross section, it is possible to maximize the rectification of the tubular portion 153 which substantially functions as the diffuser.

In this embodiment, provided is an airbag internally housing a cylinder-type inflator, comprising an insertion hole for inserting the inflator from an outside to an inside of the airbag, a diffuser which forms a semi-closed space by substantially including an opening, and a guide member for guiding the inflator into the semi-closed space upon inserting the inflator.

The foregoing guide member may be coupled to an edge of the opening so as to be capable of guiding the inflator substantially continuously from the insertion hole to the opening.

The foregoing guide member may be provided to substantially overlap with the insertion hole so as to be capable of guiding the inflator substantially continuously from the insertion hole to the opening.

Figure 9:
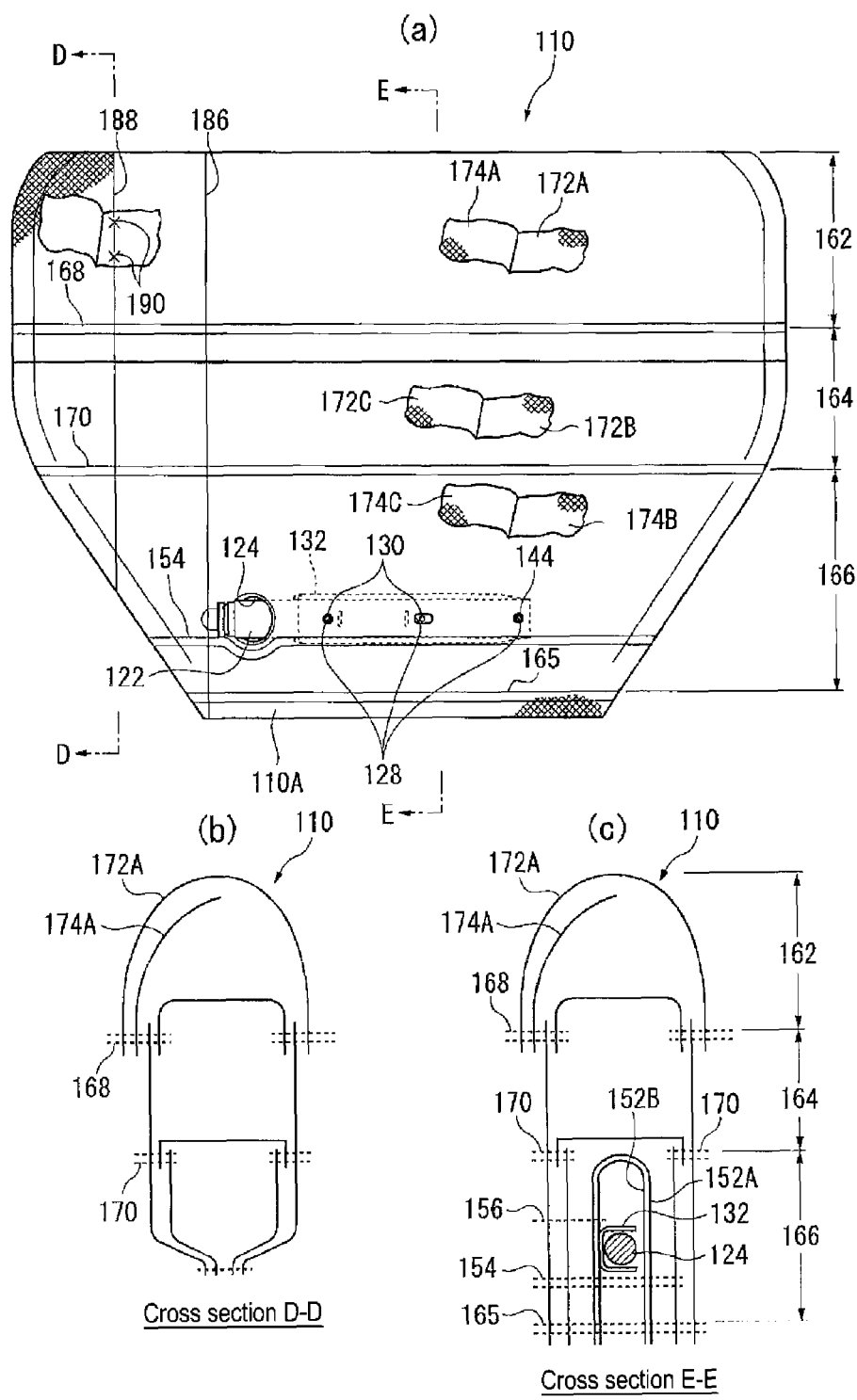
FIGS. 9(a)-9(c) are views showing a state where a portion of the cushion part of FIG. 3 is cut out and inner surface of the respective chambers is exposed.

FIG. 9(*a*) is a diagram showing a state where a portion of the cushion part 110 of FIG. 3 is cut out and inner surface of the respective chambers is exposed. FIG. 9(*a*) is a front view of the cushion part 110. FIG. 9(*b*) is a D-D cross section of FIG. 9(*a*), and is a cross section which cuts the cushion part 110 along the second folding line 188. FIG. 9(*c*) is an E-E cross section of FIG. 9(*a*), and is a cross section which cuts the cushion part 110 at the center. As illustrated in FIG. 9(*a*), the cushion part 110 comprises three, namely, first to third, chambers 162, 164, 166. The first chamber 162 and the second chamber 164 are of a substantially rectangular shape and are mutually adjacent at the boundary (third sewing line 168) of the longitudinal direction (horizontal direction of FIG. 9(*a*)) of substantially the same size.

The third chamber 166 has a substantial trapezoidal shape including an upper base (fourth sewing line 170) having a size that is substantially equivalent to the foregoing boundary of the longitudinal direction, and a lower base (outer peripheral sewing line 154) that is shorter than the fourth sewing line 170. The third chamber 166 is adjacent to the second chamber 164 at the fourth sewing line 170. The third chamber 166 houses the cylinder-type inflator 122 near and along the first sewing line 154.

How the first to fourth sewing lines 154, 156, 168, 170 respectively sew how many base fabrics is as illustrated in FIG. 9(*b*) and FIG. 9(*c*).

As illustrated in FIG. 9(*a*), of the two layered base fabrics which form the first chamber 162, the inner surface of one base fabric of the back side of the diagram is a coated fabric 172A that is coated with silicon. The outer surface of the base fabric comes into contact with the occupant's knees and restricts the occupant from moving forward. Meanwhile, of the two layered base fabrics forming the first chamber 162, the inner surface of the other base fabric of the front side of the diagram is a non-coated fabric 174A that is not coated with silicon.

While the first chamber 162 may be configured from multiple layers of base fabrics, the coated fabric 172A and the non-coated fabric 174A are the two innermost fabrics forming the first chamber 162. Note that it will suffice so as long as fabrics of different materials are used as the inner surface of the first chamber 162, and the material may be changed for the back side and the front side.

According to the foregoing configuration, it is possible to prevent the damage which often occurs in the first chamber 162. Since the first chamber 162 is farthest from the inflator 122, it is the portion where the supply of gas is the latest. The folded or wound portion remains in the first chamber 162 to the very end upon deploying the cushion part 110. Since the deployment of the cushion part 110 is delayed as described above, it is pulled and twisted by the portion that is deployed first, friction tends to arise between the inner surfaces, thereby causing damage.

Thus, with this embodiment, the portion that is easily subject to friction is formed as the coated fabric 172A and the non-coated fabric 174A. Even when these different types of fabrics are subject to friction, it is possible to much more effectively prevent damage in comparison to cases where the same type of fabric is subject to friction.

Note that the inner surfaces of the base fabric of the second chamber are coated fabrics 172B, 172C at both the back side and front side of the diagram. The inner surfaces of the base fabric of the third chamber 166 are non-coated fabrics 174B, 174C at both the back side and front side of the diagram. However, the outer surfaces (not shown) of the third chamber 166 are both coated fabrics.

Figure 10:
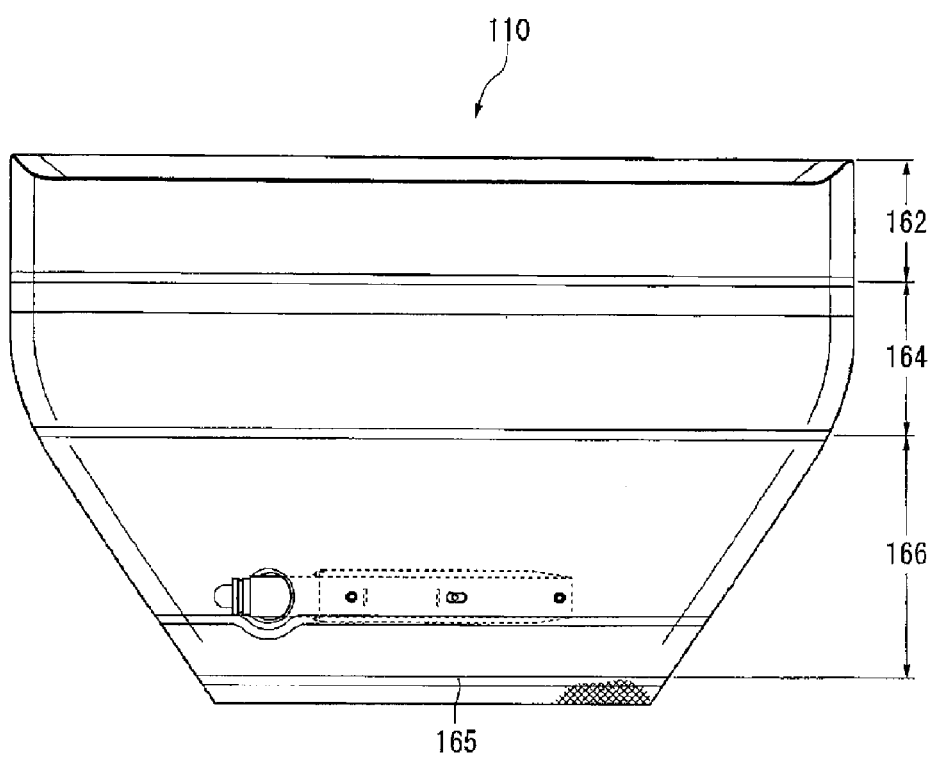
FIG. 10 is a diagram illustrating a step in the process of folding the cushion part of FIG. 9.
Figure 11:
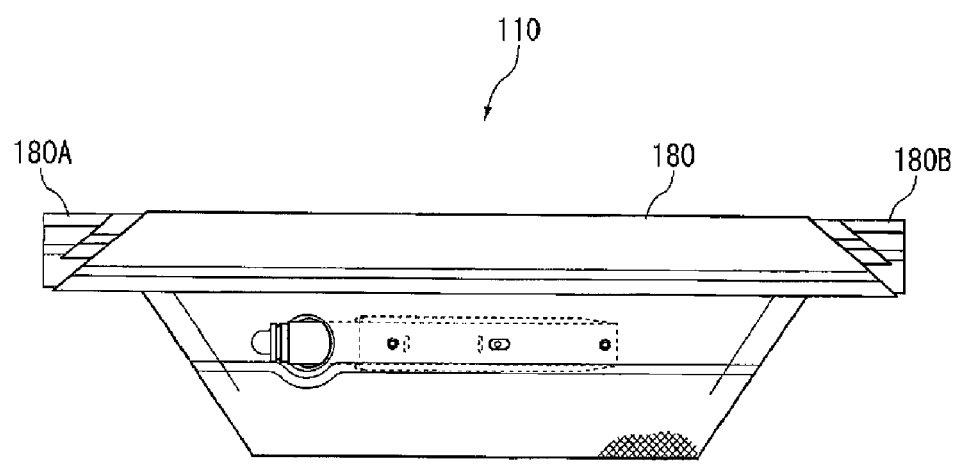
FIG. 11 is a diagram illustrating another step in the process of folding the cushion part of FIG. 9.
Figure 12:
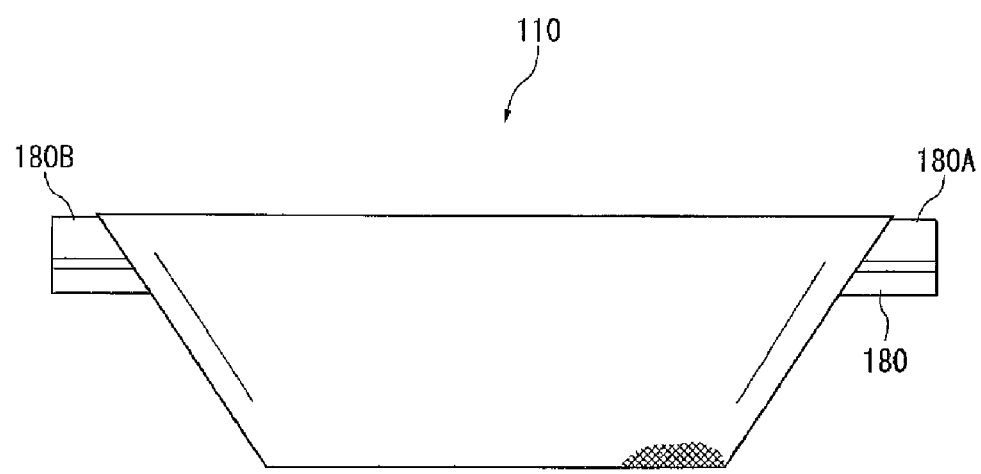
FIG. 12 is a diagram illustrating a state where the cushion part is turned over so that the roll part formed in FIG. 11 faces the back side of the diagram.

FIG. 10 to FIG. 15 are diagrams showing the process of folding the cushion part 110 of FIG. 9. As illustrated in FIG. 10, foremost, the cushion part 110 is folded or wound a plurality of times from the first chamber 162 toward the third chamber 166. Consequently, a roll part 180 is formed as illustrated in FIG. 11. FIG. 12 is a diagram illustrating a state where the cushion part 110 is turned over so that the roll part 180 formed in FIG. 11 faces the back side of the diagram.

Figure 13:
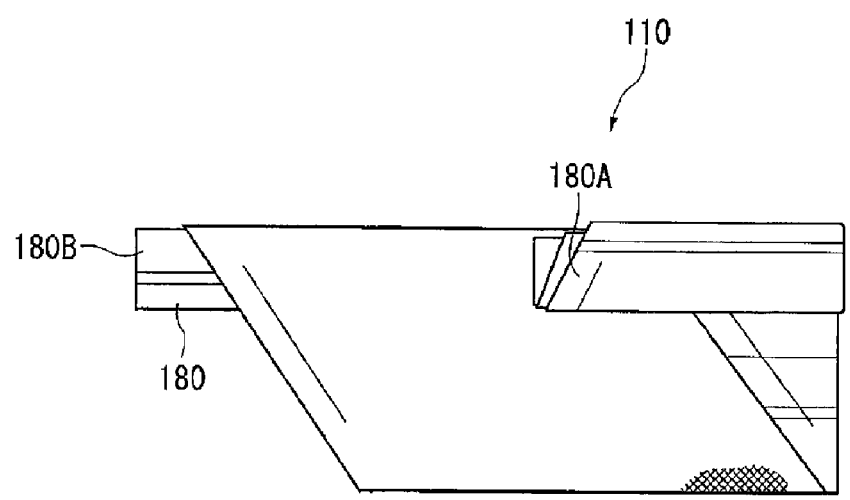
FIG. 13 is a diagram illustrating a further step the process of folding the cushion part of FIG. 9.
Figure 14:
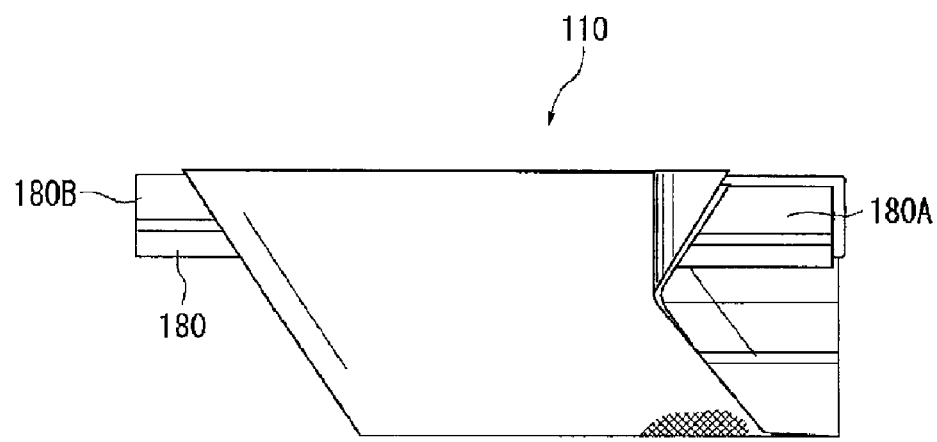
FIG. 14 is a diagram illustrating yet another step in the process of folding the cushion part of FIG. 9.
Figure 15:
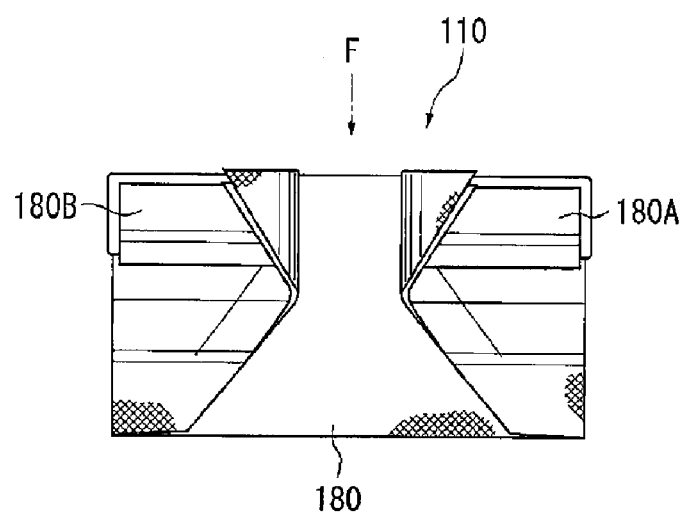
FIG. 15 is a diagram illustrating still a further step in the process of folding the cushion part of FIG. 9.

One end 180A of the roll part 180 is folded to a side that is opposite to the side where the roll part 180 is formed as illustrated in FIG. 13. This is hereafter referred to as the first fold. FIG. 14 is a diagram illustrating a state where the tip of the one end 180A of the roll part 180 subject to the first fold is additionally folded back in the direction of both ends of the roll part 180. This is hereinafter referred to as the second fold. The first fold and the second fold are performed for both ends 180A, 180B of the roll part 180 as illustrated in FIG. 15. The folding is thereby complete.

Figure 16:
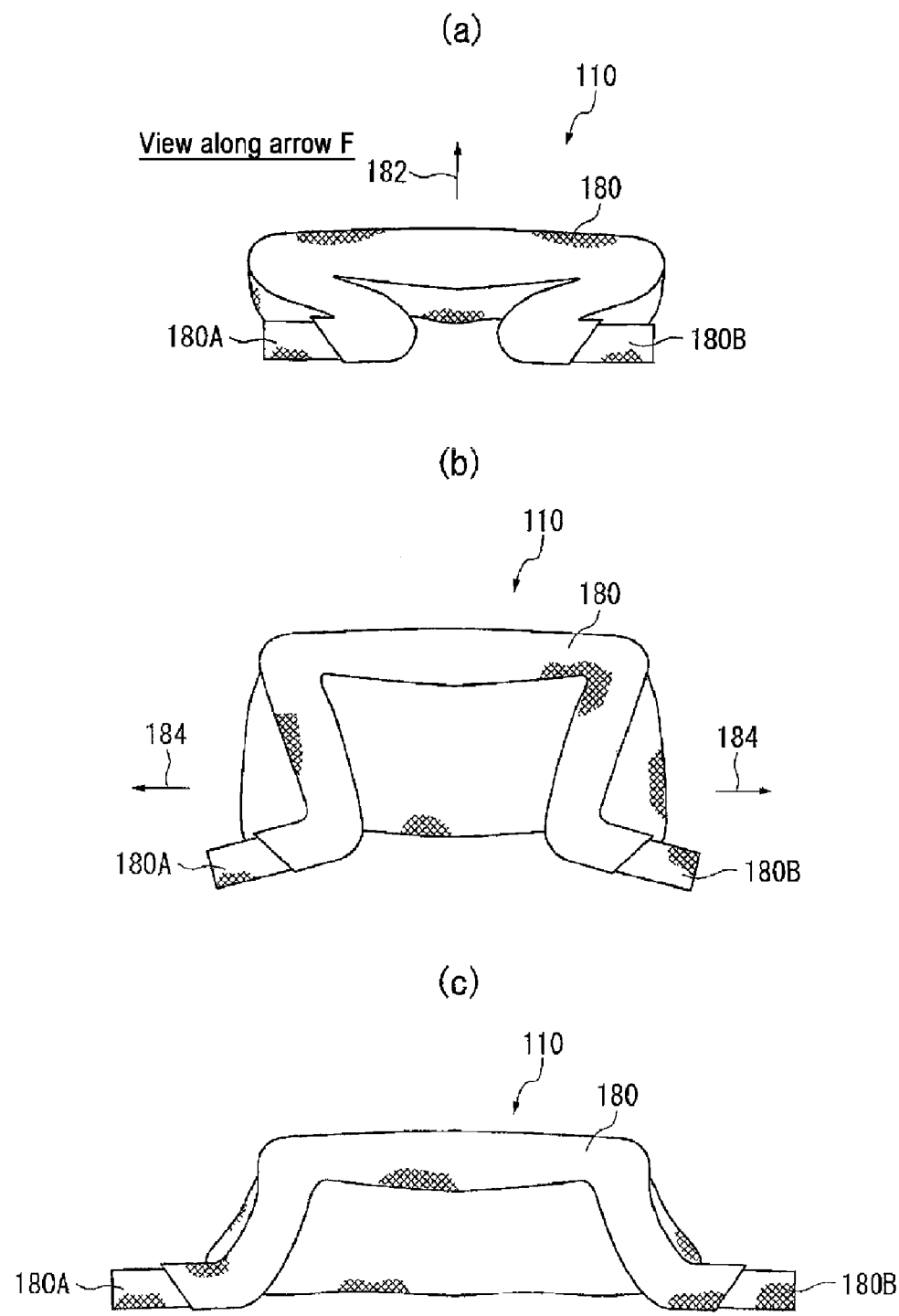
FIGS. 16(a)-16(c) are diagrams illustrating the behavior of the cushion part of FIG. 15 upon deployment.

FIGS. 16(*a*)-16(*c*) are diagrams illustrating the behavior of the cushion part 110 of FIG. 15 upon deployment. FIG. 16(*a*) corresponds to a view along an arrow F of FIG. 15, and deployment is carried out in the order of FIG. 16(*a*), FIG. 16(*b*), and FIG. 16(*c*). When viewed from the occupant sitting in the driver seat of FIG. 1, the folded cushion part 110 is in the foregoing posture, and, while it is not visible from the occupant, a substantial "Q" shape faces the occupant.

As explained with reference to FIG. 10 to FIG. 15, in the case of the folded or wound cushion part 110, the behavior thereof during deployment will not properly turn back from the final step to the first step of the folding process. In other words, as illustrated in FIG. 16(*a*), the deployment (arrow 182) of the roll part that was formed at the initial stage of the folding process is performed ahead of the behavior (arrow 184 of FIG. 16(*b*)) of deploying the two folds of the first fold and the second fold in the horizontal direction that was performed at the end of the folding process.

Accordingly, since the roll part 180 is deployed in a state where the two folds still remain, the cushion part 110 is subject to twisting. Consequently, as illustrated in FIG. 9(*a*), of the first folding line 186 and the second folding line 188 (only the left side is shown) of the inner surface of the cushion part 110, the damage 190 will arise on the track of the second folding line 188. In particular, since the first chamber 162 is positioned at the innermost side of the roll part 180, the first chamber 162 is not deployed until the end, and the inner surface is easily subject to friction due to the influence of twisting. Thus, the damage 190 often occurs on the inner surface of the first chamber 162, which is the on track of the second folding line 188.

Nevertheless, in this embodiment, since different types of coated fabric 172A and non-coated fabric 174A are formed on the inner surface of the first chamber 162, damage will not arise easily even when friction occurs.

The concept of this embodiment respect to the material of the inner surface of the cushion part 110 is summarized below. According to this embodiment, in a bag-shaped airbag (for example, knee airbag 100) containing one or more chambers, the airbag is folded or wound, and a fabric is provided to the portion (for example, near the damage 190) in the chamber (for instance, the chamber 162) in which the release is slower in comparison to the other portions when the folding or winding of the airbag is released.

The reason why the foregoing configuration is adopted is because the portion in which the release is slower in comparison to the other portions when the folding or winding of the airbag is released is likely to be damaged.

The fabric may be provided to a position which is separated from the inflator housed in the airbag and which is on the innermost side of the fold or wind.

The reason why the foregoing configuration is adopted is because, when the airbag is deployed, the fold or wind is maintained to the end at the foregoing position.

The foregoing fabric may be a non-coated fabric that is not coated with silicon (for instance, the non-coated fabric 174A).

Figure 17:
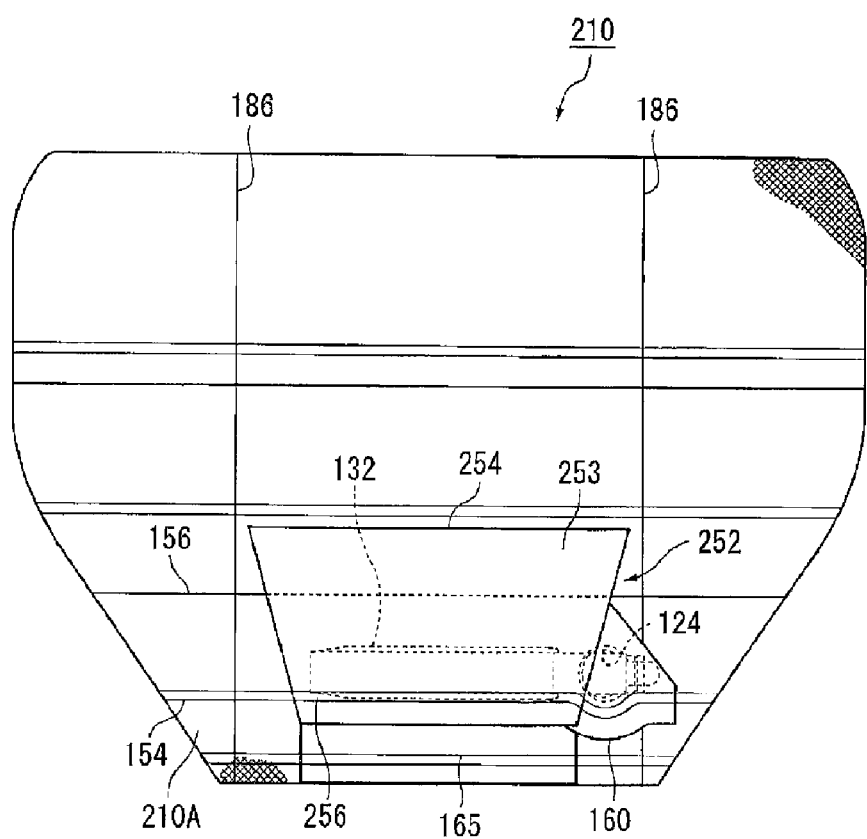
FIG. 17 is a diagram illustrating the cushion part including a diffuser which is a modified version of the diffuser of FIG. 6.

FIG. 17 is a diagram illustrating the cushion part 210 including a diffuser 252 which is a modified version of the diffuser 152 of FIG. 6. Only the differences in comparison to FIG. 6 are explained below. While the diffuser 152 of FIG. 6 included a tubular portion 153 having a rectangular cross section, the tubular portion 253 of the diffuser 252 of FIG. 17 has a trapezoidal cross section.

To put it differently, the diffuser 252 is formed by layering symmetrical trapezoidal fabrics, which are substantially joined, by folding a hexagonal fabric at one of the diagonal lines, and using the folded diagonal line as the upper base 254. The portion corresponding to the trapezoidal lower base 256 is sewn to the ground fabric 210A along the first sewing line 154. Of the tubular portion 253, the inflator 122 is inserted, together with the deflector 132, near the lower base 256.

As illustrated in FIG. 17, folding is performed along the crease (first folding line 186) which is substantially orthogonal to the longitudinal direction of the diffuser 252 on either side of the portion corresponding to the lower base 256 of the diffuser 252.

According to the foregoing configuration, the cushion part 210 is not subject to choking, and the deployment can be performed quickly. This is because the short lower base 256 does not bite into the first folding line 186, and, since the inflator 122 is inserted near the lower base 256, the outlet of the gas is not blocked.

Figure 18:
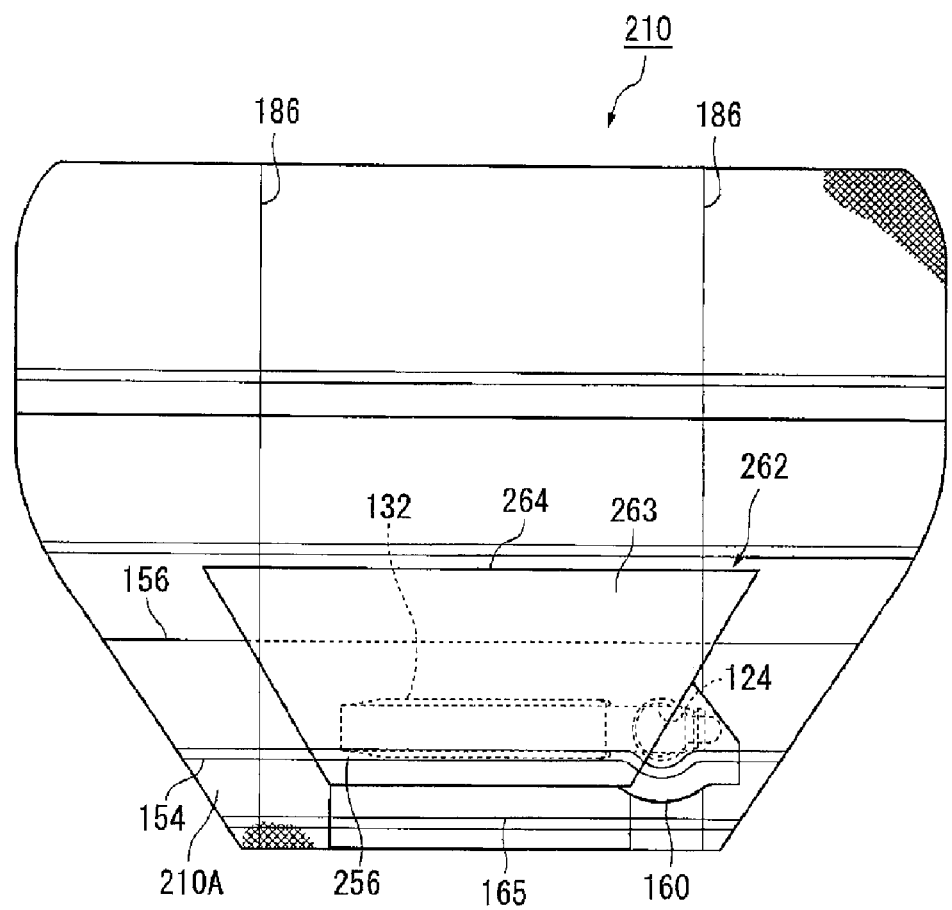
FIG. 18 is a diagram illustrating the cushion part including a diffuser which is another modified version of the diffuser of FIG. 17.

FIG. 18 is a diagram illustrating the cushion part 210 including a diffuser 262 which is another modified version of the diffuser 252 of FIG. 17. Only the differences in comparison to FIG. 17 are explained below. In comparison to the upper base 254 of FIG. 17, the upper base 264 of the diffuser 262 of FIG. 18 is longer, and is the tubular portion 263 which reaches the first folding line 186, which is the fold of the first fold. In other words, the first folding line 186 is positioned more on the inside than both ends of the portion corresponding to the upper base 264 of the diffuser.

According to the foregoing configuration, the upper base 264 of the diffuser 262 will bite into the first fold. Nevertheless, choking will not occur since the area near the lower base 256 containing the inflator 122 and the deflector 132 will not bite into the first folding line 186. Meanwhile, the quickness of deployment is maintained by extending the upper base 264 portion to a length which will bite into the first folding line 186.

The concept of this embodiment regarding the modified examples of the diffuser is summarized below. According to this embodiment, in a knee airbag which houses the cylinder-type inflator 122 in the internal diffuser 252, a roll part (for instance, the roll part 180) is formed to the knee airbag by being folded or wound in a bellows shape or rolled shape, both ends of the roll part are folded back to the center (for example, the first fold), and the outlet of the diffuser does not bite into the folding line thereof (for example, the first folding line 186). It is thereby possible to prevent choking.

Moreover, the tubular portions 253, 263 were used in the foregoing modified examples, but the portions may not be of a tubular shape, and the diffuser may be configured such that the portions are formed in a bag shape where the tubular shape is closed and the gas is guided by providing a vent hole 270.

The preferred embodiments of the present invention were described above with reference to the appended drawings. However, the foregoing embodiments are the preferred examples of the present invention, and other embodiments and other various methods may also be implemented or performed. Unless specifically limited in this specification, the present invention is not limited to the detailed shapes, sizes, configurations and arrangements of the components illustrated in the appended drawings. Moreover, the expressions and terms used in this specification are for explaining the present invention, and the present invention should not be limited thereto unless specifically indicated to such effect herein. For example, while this embodiment was entirely explained taking a knee airbag as an example, the present invention can also be applied to any and all types of airbags including a driver seat airbag, passenger seat airbag, side airbag, inflatable curtain airbag and other airbags to be mounted in a vehicle.

Accordingly, it is evident that a person skilled in the art can conceive of various modified examples or altered examples within the scope of the present claims, and it should be understood that such modifications and alterations also fall within the technical scope of the present invention as a matter of course.

We claim:

1. An airbag internally housing a cylinder-type inflator, comprising:
   a cushion part;
   an insertion hole defined in the cushion part and configured for inserting of the inflator from an outside to an inside of the airbag;
   a diffuser which forms a semi-closed space by substantially including an opening; and
   a guide member extending over and covering at least a portion of the insertion hole and configured to guide the inflator into the semi-closed space upon inserting of the inflator in through the insertion hole.

2. The airbag according to claim 1, wherein the guide member is coupled to an edge of the opening of the diffuser so as to be capable of guiding the inflator substantially continuously from the insertion hole to the opening.

3. The airbag according to claim 1, wherein the guide member substantially overlaps the insertion hole so as to be capable of guiding the inflator substantially continuously from the insertion hole to the opening of the diffuser.

4. An airbag internally housing a cylinder-type inflator, comprising:
a cushion part;
an insertion hole defined in the cushion part and positioned between first and second sewing lines provided to a base fabric of the cushion part and which is configured to enable inserting of the inflator from an outside to an inside; and
a diffuser into which the inflator inserted from the insertion hole is inserted, the diffuser having a tubular shape in which a first portion defined by layers of a folded fabric is sewn to the base fabric along the first sewing line, the fabric of the tubular shape on a side adjacent to the base fabric being additionally sewn to the base fabric along the second sewing line,
wherein the diffuser includes a guide member which extends and covers the insertion hole with a surface that continues from an inner surface of the diffuser, and which is sewn to the base fabric along the first sewing line.

5. The airbag according to claim 4, wherein the folded fabric is one of a plurality of folded fabrics cooperating to define the tubular shape, and the folded fabric located on an innermost side of the tubular shape including the guide member.

6. The airbag according to claim 5, wherein the tubular shape of the diffuser has a rectangular shape in plan view.

7. The airbag according to claim 4, wherein the tubular portion of the diffuser has a trapezoidal shape in plan view.

8. The airbag according to claim 4, wherein the tubular portion of the diffuser has a non-rectangular shape in plan view.

* * * * *